United States Patent
Da Palma et al.

(10) Patent No.: US 11,093,898 B2
(45) Date of Patent: Aug. 17, 2021

(54) SOLUTION FOR ADDING CONTEXT TO A TEXT EXCHANGE MODALITY DURING INTERACTIONS WITH A COMPOSITE SERVICES APPLICATION

(71) Applicant: INTERNATIONAL BUSINESS MACHINES CORPORATION, Armonk, NY (US)

(72) Inventors: William V. Da Palma, Broward, FL (US); Baiju D. Mandalia, Boca Raton, FL (US); Victor S. Moore, Gainesville, FL (US); Wendi L. Nusbickel, Boca Raton, FL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 130 days.

(21) Appl. No.: 16/410,170

(22) Filed: May 13, 2019

(65) Prior Publication Data

US 2019/0266569 A1    Aug. 29, 2019

Related U.S. Application Data

(63) Continuation of application No. 11/615,856, filed on Dec. 22, 2006, now Pat. No. 10,332,071, which is a (Continued)

(51) Int. Cl.
*G06Q 10/10* (2012.01)

(52) U.S. Cl.
CPC .................................. *G06Q 10/10* (2013.01)

(58) Field of Classification Search
CPC ... G06Q 10/10; H04M 2203/357; H04M 3/51
See application file for complete search history.

(56) References Cited

U.S. PATENT DOCUMENTS 5,278,943 A   1/1994  Casper et al.
5,774,551 A   6/1998  Wu et al.
(Continued)

FOREIGN PATENT DOCUMENTS

CN   1697419   11/2005
EP   1199872   4/2002
(Continued)

OTHER PUBLICATIONS

Pavlovski, Christopher et al. "Reference Architecture for 3G Thin Client Multimodal Applications" IEEE 2004 (Year: 2004).*
(Continued)

*Primary Examiner* — Stephen S Hong
*Assistant Examiner* — Nicholas Hasty
(74) *Attorney, Agent, or Firm* — Christopher Pignato; Andrew M. Calderon; Roberts Calderon Safran & Cole, P.C.

(57) ABSTRACT

The present invention discloses a solution for handling text exchange input in a composite service environment. The method can included a step of conveying text exchange input to an ACM engine. The ACM engine can map the text exchange input to field and variable values of a component services application. A memory of the composite service environment can be updated using the mapping results. Specifically, field and variable values can be updated that are stored in the memory for a session of the component services application for which the text exchange input was provided.

19 Claims, 3 Drawing Sheets

Related U.S. Application Data continuation-in-part of application No. 11/296,952, filed on Dec. 8, 2005, now abandoned, which is a continuation-in-part of application No. 11/297,542, filed on Dec. 8, 2005, now Pat. No. 8,189,563, which is a continuation-in-part of application No. 11/297,536, filed on Dec. 8, 2005, now abandoned.

(56) References Cited

U.S. PATENT DOCUMENTS

| | | |
|---|---|---|
| 5,781,720 A | 7/1998 | Parker et al. |
| 5,842,212 A * | 11/1998 | Ballurio ............... G06F 16/258 |
| 5,843,212 A | 12/1998 | Nanaji |
| 5,873,094 A | 2/1999 | Talatik |
| 6,049,779 A | 4/2000 | Berkson |
| 6,058,163 A | 5/2000 | Pattison et al. |
| 6,195,697 B1 | 2/2001 | Bowman-Amuah |
| 6,269,336 B1 | 7/2001 | Ladd et al. |
| 6,272,625 B1 | 8/2001 | DeCarmo |
| 6,298,370 B1 | 10/2001 | Tang et al. |
| 6,301,609 B1 | 10/2001 | Aravamudan et al. |
| 6,314,177 B1 | 11/2001 | Davis et al. |
| 6,317,794 B1 | 11/2001 | Papierniak et al. |
| 6,338,089 B1 | 1/2002 | Quinlan |
| 6,351,271 B1 | 2/2002 | Mainwaning et al. |
| 6,366,771 B1 | 4/2002 | Angle et al. |
| 6,370,508 B2 | 4/2002 | Beck et al. |
| 6,424,995 B1 | 7/2002 | Shuman |
| 6,442,547 B1 | 8/2002 | Bowman-Amuah |
| 6,523,035 B1 | 2/2003 | Fleming et al. |
| 6,587,558 B2 | 7/2003 | Lo et al. |
| 6,606,744 B1 | 8/2003 | Mikurak |
| 6,611,867 B1 | 8/2003 | Bowman-Amuah |
| 6,618,490 B1 | 9/2003 | Cham et al. |
| 6,662,340 B2 | 12/2003 | Rawat et al. |
| 6,704,396 B2 | 3/2004 | Parolkar et al. |
| 6,724,403 B1 | 4/2004 | Santoro et al. |
| 6,732,153 B1 | 5/2004 | Jakobson et al. |
| 6,735,287 B2 | 5/2004 | Vishnik et al. |
| 6,735,566 B1 | 5/2004 | Brand |
| 6,757,362 B1 | 6/2004 | Cooper et al. |
| 6,810,429 B1 | 10/2004 | Walsh et al. |
| 6,895,084 B1 | 5/2005 | Saylor et al. |
| 6,898,277 B1 | 5/2005 | Meteer et al. |
| 6,898,658 B2 | 5/2005 | Toguchi et al. |
| 6,910,074 B1 | 6/2005 | Amin et al. |
| 6,922,466 B1 | 7/2005 | Peterson et al. |
| 6,970,554 B1 | 11/2005 | Peterson et al. |
| 6,972,761 B1 | 12/2005 | Cox et al. |
| 6,978,247 B1 | 12/2005 | Bogart et al. |
| 6,988,126 B2 | 1/2006 | Wilcock et al. |
| 6,996,605 B2 | 2/2006 | Low et al. |
| 7,003,079 B1 | 2/2006 | McCarthy et al. |
| 7,006,605 B1 | 2/2006 | Morganstein et al. |
| 7,023,840 B2 | 8/2006 | Gotta et al. |
| 7,085,728 B2 | 8/2006 | Sarlay et al. |
| 7,149,798 B2 | 12/2006 | Rezvani et al. |
| 7,177,881 B2 | 2/2007 | Schwesit et al. |
| 7,203,907 B2 | 4/2007 | Weng et al. |
| 7,210,098 B2 | 4/2007 | Sibal et al. |
| 7,233,933 B2 | 6/2007 | Horvitz et al. |
| 7,286,480 B2 | 10/2007 | Jaim |
| 7,286,840 B2 | 10/2007 | Jain |
| 7,315,616 B2 | 1/2008 | Annadata et al. |
| 7,321,920 B2 | 1/2008 | Washburn |
| 7,330,487 B2 | 2/2008 | Chang et al. |
| 7,334,018 B2 | 2/2008 | Elms |
| 7,336,628 B2 | 2/2008 | Chang et al. |
| 7,337,405 B2 | 2/2008 | Weng et al. |
| 7,356,567 B2 | 4/2008 | Odell et al. |
| 7,386,467 B2 | 6/2008 | Eitel et al. |
| 7,418,094 B2 | 8/2008 | Golitsin et al. |
| 7,441,261 B2 | 10/2008 | Slater et al. |
| 7,480,696 B2 | 1/2009 | Kirkland et al. |
| 7,499,458 B2 | 3/2009 | McDysan et al. |
| 7,506,368 B1 | 3/2009 | Kersey et al. |
| 7,525,937 B2 | 4/2009 | O'Neill |
| 7,567,662 B1 | 7/2009 | Renner et al. |
| 7,644,351 B1 | 1/2010 | Portnoy et al. |
| 7,739,115 B1 | 6/2010 | Pettay et al. |
| 2001/0027474 A1 | 10/2001 | Nachman et al. |
| 2001/0034738 A1 | 10/2001 | Cantwell et al. |
| 2001/0052023 A1 | 12/2001 | Lin et al. |
| 2002/0016736 A1 | 2/2002 | Cannon et al. |
| 2002/0052032 A1 | 5/2002 | Curtis et al. |
| 2002/0055350 A1 | 5/2002 | Gupte et al. |
| 2002/0055967 A1 | 5/2002 | Coussement |
| 2002/0056000 A1 | 5/2002 | Coussement |
| 2002/0089539 A1 | 7/2002 | Lindhorst et al. |
| 2002/0099602 A1 | 7/2002 | Moskowitz et al. |
| 2002/0103867 A1 | 8/2002 | Schlter |
| 2002/0105909 A1 | 8/2002 | Flanagan et al. |
| 2002/0111786 A1 | 8/2002 | Sugeno et al. |
| 2002/0120674 A1 | 8/2002 | Son et al. |
| 2002/0133347 A1 * | 9/2002 | Schoneburg ............ G06F 40/35 704/257 |
| 2002/0140731 A1 | 10/2002 | Subramaniam et al. |
| 2002/0154162 A1 | 10/2002 | Bhatia et al. |
| 2002/0169613 A1 | 11/2002 | Damiba |
| 2002/0174170 A1 | 11/2002 | Ioffe et al. |
| 2002/0184346 A1 | 12/2002 | Mani |
| 2002/0184373 A1 | 12/2002 | Maes |
| 2002/0184610 A1 | 12/2002 | Chong et al. |
| 2002/0187750 A1 | 12/2002 | Majumdar |
| 2002/0194388 A1 | 12/2002 | Boloker et al. |
| 2003/0007606 A1 | 1/2003 | Suder et al. |
| 2003/0023953 A1 | 1/2003 | Lucassen et al. |
| 2003/0026269 A1 | 2/2003 | Paryani |
| 2003/0040995 A1 | 2/2003 | Daddario et al. |
| 2003/0041108 A1 | 2/2003 | Henrick et al. |
| 2003/0046088 A1 | 3/2003 | Yuschik |
| 2003/0055884 A1 | 3/2003 | Yuen et al. |
| 2003/0088421 A1 | 5/2003 | Maes et al. |
| 2003/0095540 A1 | 5/2003 | Mulligan et al. |
| 2003/0110297 A1 | 5/2003 | Tabatabai et al. |
| 2003/0108063 A1 | 6/2003 | Joseph et al. |
| 2003/0120813 A1 | 6/2003 | Majumdar et al. |
| 2003/0156706 A1 | 8/2003 | Koehler et al. |
| 2003/0182622 A1 | 9/2003 | Sibal et al. |
| 2003/0187944 A1 | 10/2003 | Johnson et al. |
| 2003/0204561 A1 | 10/2003 | Briscoe et al. |
| 2003/0212762 A1 | 11/2003 | Barnes et al. |
| 2003/0223381 A1 | 12/2003 | Schroderus |
| 2004/0030750 A1 * | 2/2004 | Moore ............... H04L 12/1403 709/204 |
| 2004/0039795 A1 | 2/2004 | Percival |
| 2004/0054740 A1 | 3/2004 | Daigle et al. |
| 2004/0078787 A1 | 4/2004 | Borek et al. |
| 2004/0080535 A1 | 4/2004 | Lueckhoff et al. |
| 2004/0104938 A1 | 6/2004 | Saraswat et al. |
| 2004/0128342 A1 | 7/2004 | Maes et al. |
| 2004/0133888 A1 | 7/2004 | Ard et al. |
| 2004/0146010 A1 | 7/2004 | Gass et al. |
| 2004/0162726 A1 | 8/2004 | Chang |
| 2004/0172254 A1 | 9/2004 | Sharma et al. |
| 2004/0172258 A1 | 9/2004 | Dominach et al. |
| 2004/0181461 A1 | 9/2004 | Raiyani et al. |
| 2004/0100529 A1 | 10/2004 | Clark et al. |
| 2004/0199574 A1 | 10/2004 | Franco et al. |
| 2004/0205614 A1 | 10/2004 | Keswa |
| 2004/0208307 A1 | 10/2004 | Walker et al. |
| 2004/0215824 A1 | 10/2004 | Payrits |
| 2004/0218751 A1 | 11/2004 | Colson et al. |
| 2004/0230466 A1 | 11/2004 | Davis et al. |
| 2004/0239754 A1 | 12/2004 | Shachar |
| 2004/0250201 A1 | 12/2004 | Caspi |
| 2004/0254957 A1 | 12/2004 | Hyotyniemi et al. |
| 2004/0255030 A1 | 12/2004 | Sillanpaa |
| 2005/0021826 A1 | 1/2005 | Kumar |
| 2005/0027495 A1 | 2/2005 | Matichuk |
| 2005/0047579 A1 | 3/2005 | Salame |
| 2005/0060138 A1 | 3/2005 | Wang et al. |
| 2005/0069225 A1 | 3/2005 | Schneider et al. |
| 2005/0102606 A1 | 5/2005 | Sasaki et al. |

(56) References Cited

U.S. PATENT DOCUMENTS

| | | |
|---|---|---|
| 2005/0105712 A1 | 5/2005 | Williams et al. |
| 2005/0125541 A1 | 6/2005 | Frank et al. |
| 2005/0129198 A1 | 6/2005 | Sudhir et al. |
| 2005/0132023 A1 | 6/2005 | Cazzolla et al. |
| 2005/0136897 A1 | 6/2005 | Praveenkumar et al. |
| 2005/0137875 A1 | 6/2005 | Kim et al. |
| 2005/0147216 A1 | 7/2005 | Janakiraman et al. |
| 2005/0152522 A1 | 7/2005 | Kumhyr |
| 2005/0172331 A1 | 8/2005 | Blackketter et al. |
| 2005/0195823 A1 | 9/2005 | Chen et al. |
| 2005/0198099 A1 | 9/2005 | Motsinger et al. |
| 2005/0203944 A1 | 9/2005 | Dinh et al. |
| 2005/0251393 A1 | 11/2005 | Georgescu |
| 2005/0257148 A1 | 11/2005 | Goodman et al. |
| 2005/0261909 A1 | 11/2005 | Sienel et al. |
| 2005/0278444 A1 | 12/2005 | Sims et al. |
| 2005/0283364 A1 | 12/2005 | Longe et al. |
| 2005/0286705 A1 | 12/2005 | Contolini et al. |
| 2005/0286707 A1 | 12/2005 | Erhart et al. |
| 2006/0015600 A1 | 1/2006 | Piper |
| 2006/0023864 A1 | 2/2006 | Krahn |
| 2006/0023865 A1 | 2/2006 | Nice et al. |
| 2006/0031077 A1 | 2/2006 | Dalton et al. |
| 2006/0036770 A1 | 2/2006 | Hosn et al. |
| 2006/0069563 A1 | 3/2006 | Ju et al. |
| 2006/0074980 A1 | 4/2006 | Sarkar |
| 2006/0101143 A1 | 5/2006 | Garcia et al. |
| 2006/0104433 A1 | 5/2006 | Simpson et al. |
| 2006/0112400 A1 | 5/2006 | Zhang et al. |
| 2006/0126816 A1 | 6/2006 | Shaffer et al. |
| 2006/0168002 A1 | 7/2006 | Chesley |
| 2006/0176901 A1 | 8/2006 | Terai et al. |
| 2006/0182258 A1 | 8/2006 | Sisselman et al. |
| 2006/0190580 A1* | 8/2006 | Shu ................ H04L 67/04 709/223 |
| 2006/0195584 A1 | 8/2006 | Baumann |
| 2006/0200589 A1 | 9/2006 | Koch et al. |
| 2006/0200754 A1 | 9/2006 | Kablesh et al. |
| 2006/0212511 A1 | 9/2006 | Garcia-Martin |
| 2006/0282856 A1 | 12/2006 | Errico et al. |
| 2006/0287866 A1 | 12/2006 | Cross et al. |
| 2007/0005990 A1 | 1/2007 | Sathish |
| 2007/0026852 A1 | 2/2007 | Logan et al. |
| 2007/0047715 A1 | 3/2007 | Madhusudan et al. |
| 2007/0049281 A1 | 3/2007 | Chen et al. |
| 2007/0071224 A1 | 3/2007 | Shtivelman et al. |
| 2007/0081557 A1 | 4/2007 | Binetti et al. |
| 2007/0100981 A1 | 5/2007 | Adamczyk et al. |
| 2007/0109979 A1 | 5/2007 | Fu et al. |
| 2007/0116223 A1 | 5/2007 | Burke et al. |
| 2007/0124507 A1 | 5/2007 | Gurram et al. |
| 2007/0132834 A1 | 6/2007 | DaPalma et al. |
| 2007/0133507 A1 | 6/2007 | DaPalma et al. |
| 2007/0133508 A1 | 6/2007 | DaPalma et al. |
| 2007/0133509 A1 | 6/2007 | Da Palma et al. |
| 2007/0133511 A1 | 6/2007 | DaPalma et al. |
| 2007/0133512 A1 | 6/2007 | Da Palma et al. |
| 2007/0133513 A1 | 6/2007 | Da Palma et al. |
| 2007/0133769 A1 | 6/2007 | DaPalma et al. |
| 2007/0133773 A1 | 6/2007 | Da Palma et al. |
| 2007/0136420 A1 | 6/2007 | Da Palma et al. |
| 2007/0136421 A1 | 6/2007 | DaPalma et al. |
| 2007/0136436 A1 | 6/2007 | DaPalma et al. |
| 2007/0136442 A1 | 6/2007 | DaPalma et al. |
| 2007/0136448 A1 | 6/2007 | DaPalma et al. |
| 2007/0136449 A1 | 6/2007 | DaPalma et al. |
| 2007/0136793 A1 | 6/2007 | DaPalma et al. |
| 2007/0147355 A1 | 6/2007 | DaPalma et al. |
| 2007/0180075 A1 | 8/2007 | Chasman et al. |
| 2007/0201676 A1 | 8/2007 | Gillis et al. |
| 2007/0266075 A1 | 11/2007 | Jachner |
| 2007/0286180 A1 | 12/2007 | Marquette et al. |
| 2007/0288247 A1 | 12/2007 | Mackay |
| 2008/0003964 A1 | 1/2008 | Alperin et al. |
| 2008/0037752 A1 | 2/2008 | Chatilov et al. |
| 2008/0086564 A1 | 4/2008 | Putman et al. |
| 2008/0167914 A1 | 7/2008 | Ikeda et al. |
| 2008/0183852 A1 | 7/2008 | Pramer et al. |
| 2008/0192908 A1 | 8/2008 | O'Keefe et al. |
| 2009/0254757 A1 | 10/2009 | Toyama et al. |
| 2010/0218084 A1 | 8/2010 | Sivadas et al. |

FOREIGN PATENT DOCUMENTS

| | | |
|---|---|---|
| EP | 1237349 | 9/2002 |
| EP | 1484903 | 9/2002 |
| FR | 2844127 | 3/2004 |
| WO | 2000005903 | 2/2000 |
| WO | 2001031472 | 5/2001 |
| WO | 02073331 | 9/2002 |
| WO | 2003079144 | 9/2003 |

OTHER PUBLICATIONS

Kimbrough, S.O., et al., "On Automated Message Processing in Electronic Commerce and Work Support Systems: Speech Act Theory and Expressive Felicity", ACM Transactions on Information Systems, vol. 15, No. 4, pp. 321-367, Oct. 1997.

Brabrand, C., et al., "The <bigwig> Project", ACM Transactions on Internet Technology, vol. 2, No. 2, pp. 79-114, May 2002.

Fielding, R.T., et al., "Principled Design of the Modem Web Architecture", ACM Transactions on Internet Technology, vol. 2, No. 2, pp. 115-150, May 2002.

Keidl, M., et al., "Flexible and Reliable Web Service Execution," [online] Proc. of Workshop on Entwicklung van Anwendungen auf der Basis der XML Web-Service Technologies, retrieved from the Internet: <http://fciteseerx.ist.psu.edu/viewdoc/summary?doi=10.1. 1.8.8890>.

Engelsma, J., et al., Distributed Multimodal Synchronization Protocol; IETF Standard-Working Draft, Internet Engineering Task Force, IETF, CH, Jul. 8, 2005, pp. 1-71.

Georgescu, J.C., et al. "Multimodal IMS Services: The Adaptive Keyword Spotting Interaction Paradigm," [online] ICAS-ICNS 2005, Int'l Cont. Autonomic and Autonomous Systems / Int'l Cont. on Networking and Services pp. 21, 2005 [retrieved Jun. 4, 2010J retrieved from the Internet: <http://www.computer.org/portal/web/csdl/doi/10.1109/ICAS-ICNS.2005.67>.

Atkins, D., et al., "Common Presence and Instant Messaging: Message Format," [online] Internet Engineering Task Force, IETF, CH, vol. IMPP, No. 8, Jan. 9, 2003, [retrieved on Feb. 7, 2008] retrieved from the Internet: <http:/ftools.ietf.org/html/draft-ietf-impp-cpim-msgfmt-08>.

Sugano, H., et al., "Presence Information Data Format (PIDF)," [online] Internet Engineering Task Force, IETF, CH, vol. IMPP, No. 8, May 1, 2003, [retrieved on Feb. 7, 2008] retrieved from the Internet: <http://tools.ietf.org/html/draft-ietf-impp-cpim-pidf-08>.

Peterson, J., "Common Profile for Presence (CPP)," [online] Internet Engineering Task Force, IETF, CH, vol. IMPP, No. 4, Aug. 14, 2003, [retrieved on Feb. 7, 2008] retrieved from the Internet: <http://tools.ietf.org/html/draft-ietf-impp-pres-04>.

Bodel, M., et al., "W3C Multimodal Interaction Citation," [online] May 6, 2003, pp. 1-19, XP002305381; [retrieved Jun. 4, 2010] retrieved from the Internet: <http://www.w3.org/TR/mmi-framework/>.

Schulzrinne, H., et al., "RPID: Rich Presence Extensions to the Presence Information Data Format (PIDF)," [online] Internet Engineering Task Force, IETF, CH, Jul. 1, 2006, [retrieved on Feb. 7, 2008] retrieved from the Internet: <http://www.ietf.org/rfc/rfc4480.txt>.

Olsson, D., et al., "MEP—A Media Event Platform", Mobile Networks and Applications, Kluwer Academic Publishers, vol. 7, No. 3, pp. 235-244, 2002.

Meng, H., et al., "ISIS: An Adaptive, Trilingual Conversational System With Interleaving Interaction and Delegation Dialogs", ACM Transactions on Computer Human Interaction, vol. 11, No. 3, pp. 268-299, Sep. 2004.

Da Palma, et al., "Composite Service Delivery", U.S. Appl. No. 11/297,536, filed Dec. 8, 2005.

(56) References Cited

OTHER PUBLICATIONS

Da Palma, et al., "Initiating Voice Access to a Session From a Visual Access Channel to the Session in a Composite Services Delivery System", U.S. Appl. No. 11/296,952, filed Dec. 8, 2005.
Da Palma, et al., "View Coordination for Callers in a Composite Services Enablement Environment", U.S. Appl. No. 11/297,542, filed Dec. 8, 2005.
Da Palma, et al., "Visual Channel Refresh Rate Control for Composite Services Delivery", U.S. Appl. No. 11/297,080, filed Dec. 8, 2005.
Da Palma, et al., "Composite Services Enablement of Visual Navigation Into a Call Center", U.S. Appl. No. 11/297,541, filed Dec. 8, 2005.

* cited by examiner

SOLUTION FOR ADDING CONTEXT TO A TEXT EXCHANGE MODALITY DURING INTERACTIONS WITH A COMPOSITE SERVICES APPLICATION

CROSS-REFERENCE TO RELATED APPLICATIONS

This continuation-in-part application claims the benefit of U.S. patent application Ser. No. 11/297,536 filed Dec. 8, 2005; U.S. patent application Ser. No. 11/296,952 filed Dec. 8, 2005; and, U.S. patent application Ser. No. 11/297,542 filed Dec. 8, 2005 which are hereby incorporated by reference herein.

BACKGROUND

Field of the Invention

The present invention relates to the field of composite services, and, more particularly, to a solution for adding context to a text exchange modality during interactions with an automated application executing in a composite services environment.

Description of the Related Art

A composite services environment permits users to interact with automated applications using different interactive channels, interface types, and modalities. An interactive session of the application can concurrently share information with multiple clients, which can interact using different modalities.

For example, two different users (or a single user) can concurrently participate in a single application session; one interaction occurring via a mobile phone over a voice channel and the other occurring via a browser over a Web (e.g., data) channel. User input provided over the voice channel can cause a dynamic update to browser presented information. For instance the phone user can provide their name and account number to a voice response system. This information can be recorded by the composite services application and placed in a shared memory used by many modalities. When the shared memory is updated, interfaces of every concurrent interface sharing this memory can be dynamically updated. Thus, a Web form can presented in the Web browser can be dynamically updated so that fields associated with a user name and account are filled with content corresponding to the voice input.

Problems interacting with a composite service application can occur when one interactive modality is a free form input modality (i.e., a chat modality) and a different one is tightly constrains or directs input/output. A composite service application needs to translate input entered into the chat interface to data fields of a Web modality or to voice dialog. The problem is generally one of how to derive context from a free form input, such as chat input, and applying that context modified input to concrete data fields, which are shared by other less free-form modalities.

SUMMARY OF THE INVENTION

The present invention utilizes Natural Language Understanding (NLU) runtime components to apply context to free-form input, such as text entered through a text exchange interface. NLU runtime components exist that use application specific statistical models. These models can be referred to as Action Classifier Modules (ACMs). These ACMs map natural language requests from a user to one of many possible routing targets. As traditionally used, ACMs cause an interactive session to branch to a directed dialog form and/or cause a caller to be routed to a human agent that specializes in handling issues of a type that a user is experiencing. For example, a traditional usage of an ACM can automatically direct a call to an electronics department in response to a free form input from a user that is related to electronics.

The present invention uses ACMs in a novel way to apply context to a text exchange interaction with a composite services application. Instead of using NLU statistical models (built from a list of sentences) to route a call, the NLU statistical models can be used to discover what fields in the data store are associated with text-exchange input. Values for these fields are then updated based upon text-exchange content. Listeners associated with other clients, such as Web browser client and/or a voice client, can detect the value updates and can trigger client specific update events. For example, GUI elements of a Web browser linked to the fields can be dynamically updated based upon the text exchange input.

The present invention can be implemented in accordance with numerous aspects consistent with material presented herein. For example, one aspect of the present invention can include a method for handling text exchange input in a composite service environment. The method can included a step of conveying text exchange input to an ACM engine. The ACM engine can map the text exchange input to field and variable values associated with concrete fields of a component services application. A memory of the composite service environment can be updated using the mapping results. Specifically, variable values can be updated that are stored in the memory for a session of the component services application for which the text exchange input was provided.

Another aspect of the present invention can include a method for handling text exchange input in a composite services environment. In the method, user provided text exchange input can be received. The text exchange input can be conveyed to a Chatbot software object. The text exchange input can then be processed through a NLU runtime component to identify application specific fields to which the text exchange input is associated. The Chatbot software object can send a context applied message to a model server of the composite services environment. The context applied message can include the identified fields and related value data that was contained in the text exchange input. The model server can update shared data upon receipt of the context applied message.

Still another aspect of the present invention can include a component services system that includes a data storage area and an ACM engine. The data storage area can include data fields and values for an interactive session of a composite services application. Clients of the composite services application participating in the interactive session can utilize the data storage area to update the values based upon input entered into the clients. The clients can also obtain information from the data fields and values for presentation to a user. The ACM can map in real time free form text input to data fields and values for the interaction session of the composite services application, which applies application specific context to user provided free form input.

It should be noted that various aspects of the invention can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, or any other recording medium. The program can also be provided as a digitally encoded signal conveyed via a carrier wave. The described program can be a single program or can be implemented as multiple subprograms, each of which interact within a single computing device or interact in a distributed fashion across a network space.

It should also be noted that the methods detailed herein can also be methods performed at least in part by a service agent and/or a machine manipulated by a service agent in response to a service request.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
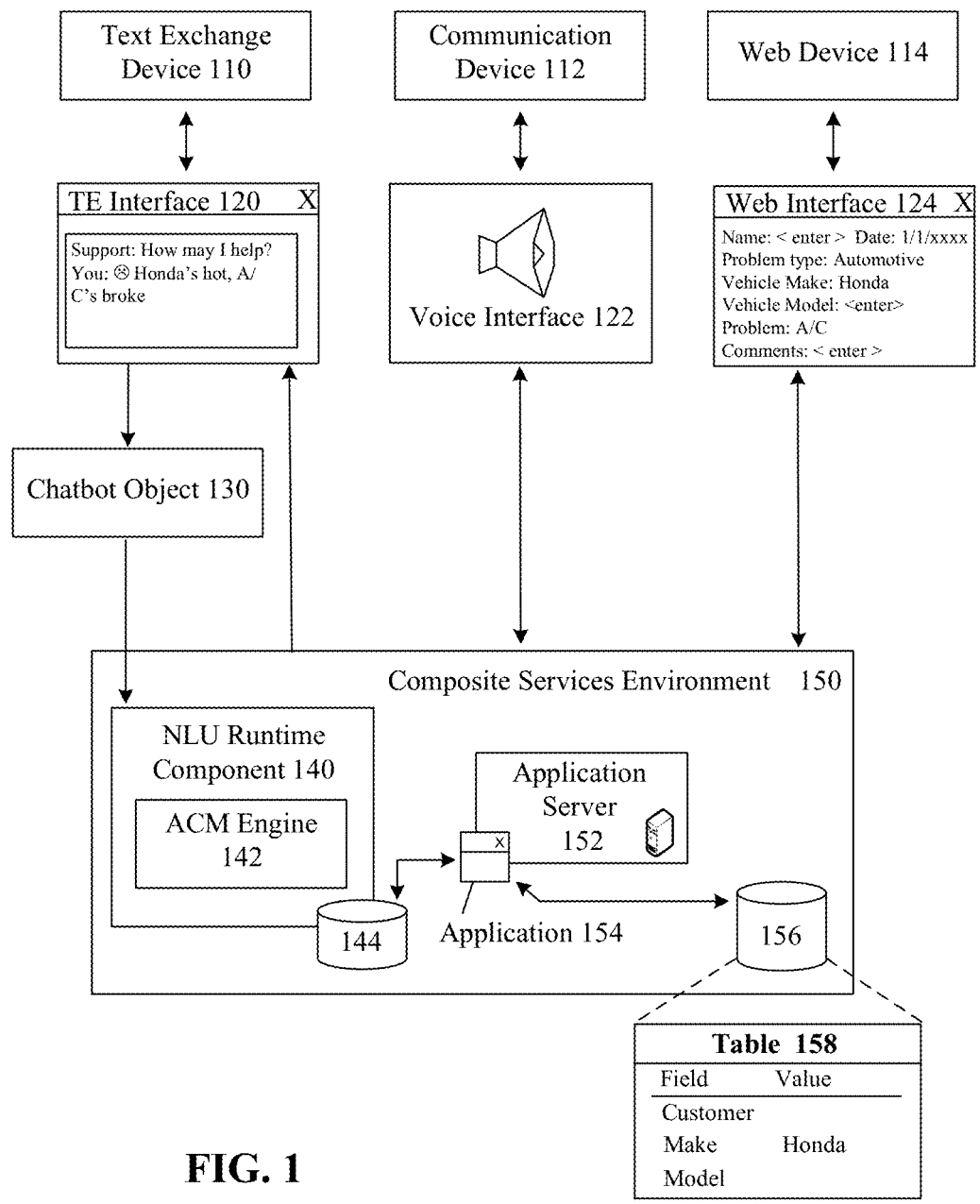
FIG. 1 is a schematic diagram of a system for interacting with a composite services environment in a manner in which application specific context is applied to text exchange input in accordance with an embodiment of the inventive arrangements disclosed herein.

FIG. 1 is a schematic diagram of a system 100 for interacting with a composite services environment 150 in a manner in which application specific context is applied to text exchange input in accordance with an embodiment of the inventive arrangements disclosed herein. In system 100, a Chatbot object 130 is used to apply application context to free form input. That is, the Chatbot object 130 determines fields of a composite services application 154 to which free form input relates. More specifically, Natural Language Understanding (NLU) runtime component 140 can use statistical language models to determine applicable fields from free form input. After this determination is made, the Chatbot object 130 can send an information update message to the application 154, which is used to update information in table 158. Table 158 updates can be conveyed to other clients 112-114 accessing composite services application 154.

To illustrate, a user can enter text input into text exchange interface 120, such as "97 Honda's too hot ;-(. Something's wrong. Can you fix it?" The Chatbot Object 130 can run this input through the NLU runtime component 140, which can specifically utilize Action Classifier Module (ACM) engine 142. The NLU component 140 can first determine that the input relates to "automotive repair," that has a specific application model (stored in data store 144). This model can be associated with table 158, which includes multiple model fields and values, such as customer, make, and model. The NLU component 140 can match input to these fields. For example, Honda can be mapped to a make field. Other fields of table 158 of data store 156 can include, CarYear that can map to 1997, CarPart, CarPartStatus, CarVIN, CarOwner, and the like. After the matches are performed, suitable values of table 158 can be updated. Other interfaces 122-124 can make use of this updated table 158 information. For example, graphical user interface (GUI) element of interface 124 that is bound to a field of table 158 can be updated.

In system 100, different types of devices, such as a text exchange device 110, a communication device 112, and a Web device 114, can each access composite services application 154 executed by application server 152 contained within environment 150 via appropriate interfaces (e.g., text exchange interface 120, voice interface 122, and Web interface 124).

The text exchange interface 120 can include any interface capable of exchanging text in real time, such as a chat interface, an instant messaging interface, and a text messaging interface. The voice interface 112 can be any interface configured for real time voice communications, such as a mobile telephone interface, communication interface of a desktop computer, a Voice over Internet Protocol (VoIP) interface, and the like. The Web interface 120 can be any interface capable of rendering markup or Web based content. For example, the Web interface 120 can be a Web browser.

The NLU runtime component 140 can use statistical models that map natural language requests (i.e., free form input) to one of many possible routing targets. In one embodiment, the statistical models can be specifically designed to handle text interface input, such as emoticons and chat slang. The routing targets of system 100 are table 158 fields. The Chatbot object 130 can be a software object containing programmatic logic designed to relate free form data to concrete model items (e.g., fields and field values of table 158).

Various communicatively linked components 110, 112, 114, 130, 140, 144, 152, and 156 that are illustrated in system 100 can be connected via one or more networks (not shown). The networks can include any hardware/software/ and firmware necessary to convey digital content encoded within carrier waves. Content can be contained within analog or digital signals and conveyed through data or voice channels. The networks can include local components and data pathways necessary for communications to be exchanged among computing device components and between integrated device components and peripheral devices. The networks can also include network equipment, such as routers, data lines, hubs, and intermediary servers which together form a packet-based network, such as the Internet or an intranet. The networks can further include circuit-based communication components and mobile communication components, such as telephony switches, modems, cellular communication towers, and the like. The networks can include line based and/or wireless communication pathways.

Each of the data stores 144 and 158 can be a physical or virtual storage spaces configured to store digital content. Data stores 144 and/or data store 158 can be physically implemented within any type of hardware including, but not limited to, a magnetic disk, an optical disk, a semiconductor memory, a digitally encoded plastic memory, a holographic memory, or any other recording medium. Further, each data store 144 and 158 can be a stand-alone storage unit as well as a storage unit formed from a plurality of physical devices. Additionally, content can be stored within data stores 144 and 158 in a variety of manners. For example, content can be stored within a relational database structure or can be stored within one or more files of a file storage system, where each file may or may not be indexed for information searching purposes. Further, the data stores 144 and 158 can utilize one or more encryption mechanisms to protect stored content from unauthorized access.

It should be appreciated that the specific arrangements of system 100 are for illustrative purposes only and that the invention is not to be construed as limited to exact arrangements expressed herein. For example, system 100 shows Chatbot object 130 as external to the composite services environment 150 and shows the NLU runtime component 140 as internal to the environment 150. In one contemplated embodiment (which is graphically illustrated in FIG. 2) the Chatbot object 130 can be a component of environment 150. In another embodiment, the NLU component 140 can be implemented outside environment 150, yet be implemented in a manner so that it is able to share application context information concerning application 154, such as through an API interface.

Figure 2:
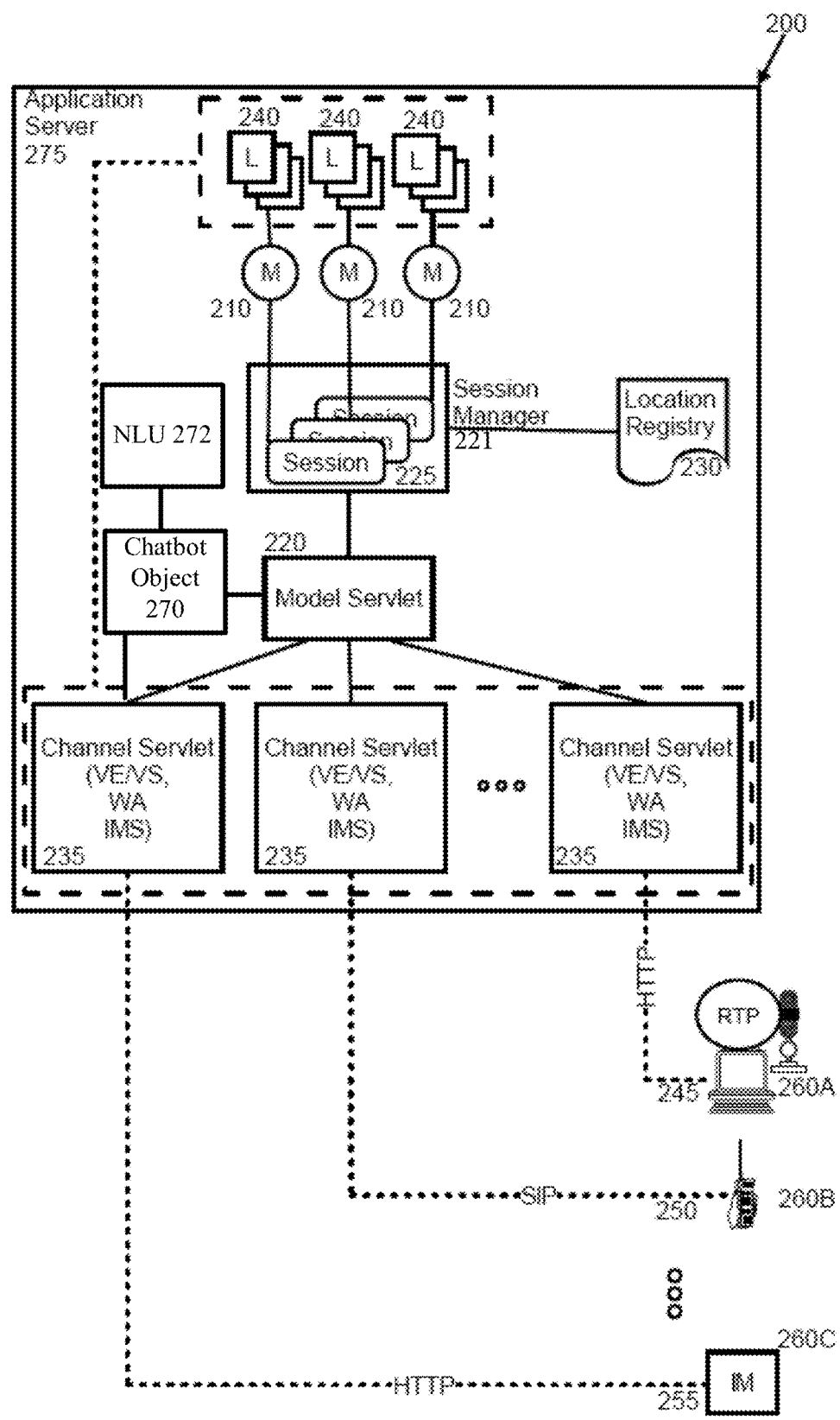
FIG. 2 is a schematic illustration of a component services environment that uses a Chatbot object to add context to text exchange interactions in accordance with an embodiment of the inventive arrangements disclosed herein.

FIG. 2 is a schematic illustration of a component services environment 200 that uses a Chatbot object 270 to add context to text exchange interactions in accordance with an embodiment of the inventive arrangements disclosed herein. Environment 200 is one contemplated embodiment for environment 150. In the composite services environment 200, different channels of access to a service can be established for accessing a service through corresponding different modalities of access including voice and visual (e.g., Web and/or Text Exchange) modes. A service can be concurrently accessed by different clients using different communication channels. Additionally, free-form input (i.e., text exchange input) can be routed through a Chatbot object 270, which uses a NLU component 272 to map the input to application specific fields for a suitable application context.

Specifically, interactions with a service within a communication session can be provided across selected ones of the different communication channels, each channel corresponding to a different modality of access to the service. In the case of a voice modality and a visual modality, a separate markup document can be utilized in each selected channel according to the particular modality for that channel.

Importantly, each channel utilized for accessing a service within a session can be associated with each other channel accessing the service within the same session. In consequence, the state of the service—stored within a model in a model-view-controller architecture—can be maintained irrespective of the channel used to change the state of the service. Moreover, the representation of the service can be synchronized in each view for the selected ones of the different channels. As such, an end user can interact with the service in a single session across different channels of access using different modalities of access without requiring burdensome, proprietary logic deployed within a client computing device.

As illustrated, composite services can operate in an application server 275 and can include multiple channel servlets 235 configured to process communicative interactions with corresponding sessions 225 for a composite multimedia service over different channels of access 245, 250, 255 for different endpoint types 260A, 260B, 260C in a communication network. In this regard, the channel servlets 235 can process voice interactions as a voice enabler and voice server to visual endpoint 260A incorporating a voice interface utilizing the Real Time Protocol (RTP) over HTTP, or a voice endpoint 260B utilizing Session Initiation Protocol (SIP). Likewise, the channel servlets 235 can process visual interactions as a Web application to a visual endpoint. As yet another example, the channel servlets 235 can process instant message interactions as an instant messaging server to an instant messaging endpoint 260C.

More specifically, the channel servlets 235 can be enabled to process HTTP requests for interactions with a corresponding session 225 for a composite multimedia service. The HTTP requests can originate from a visual mode oriented Web page over a visual channel 245, from a visual mode oriented text exchange interface over a text exchange channel 255, or even in a voice mode over a voice channel 250 enabled by SIP. When interactions occur over channel 255, Chatbot object 270 can provide context using NLU component 272, as detailed in system 100. The channel servlets 235 can be enabled to process SIP requests for interactions with a corresponding session 225 for a composite multimedia service through a voice enabler which can include suitable voice markup, such as VoiceXML and call control extensible markup language (CCXML) coupled to a SIPlet which, in combination, can be effective in processing voice interactions for the corresponding session 225 for the composite multimedia service, as it is known in the art.

Each of the channel servlets 235 can be coupled to a model servlet 220. The model servlet 220 can mediate interactions with a model 210 for an associated one of the sessions 225. Each of the sessions 225 can be managed within a session manager 220 which can correlate different channels of communication established through the channel servlets 235 with a single corresponding one of the sessions 225. The correlation of the different channels of communication can be facilitated through the use of a coupled location registry 230. The location registry 230 can include a table indicating a host name of systems and channels active for the corresponding one of the sessions 225.

The model servlet 220 can include program code enabled to access a model 210 for a corresponding session 225 for a composite multimedia service providing different channels of access 245, 250, 255 through different endpoints 260A, 260B, 260C. For instance, the model 210 can be encapsulated within an entity bean within a bean container. Moreover, the model 210 can store session data for a corresponding one of the sessions 225 irrespective of the channel of access 245, 250, 255 through which the session data for the corresponding one of the sessions 225 is created, removed or modified.

Notably, changes in state for each of the sessions 225 for a composite multimedia service can be synchronized across the different views 260 for the different channels of access 245, 250, 255 through a listener architecture. The listener architecture can include one or more listeners 240 for each model 210. Each listener can correspond to a different channel of access 245, 250, 255 and can detect changes in state for the model 210. Responsive to detecting changes in state for the model 210 for a corresponding one of the sessions 225 for a composite multimedia service, a listener 240 can provide a notification to subscribing view 260 through a corresponding one of the channel servlets 235 so as to permit the subscribing views 260 to refresh to incorporate the detected changes in state for the model 210.

Figure 3:
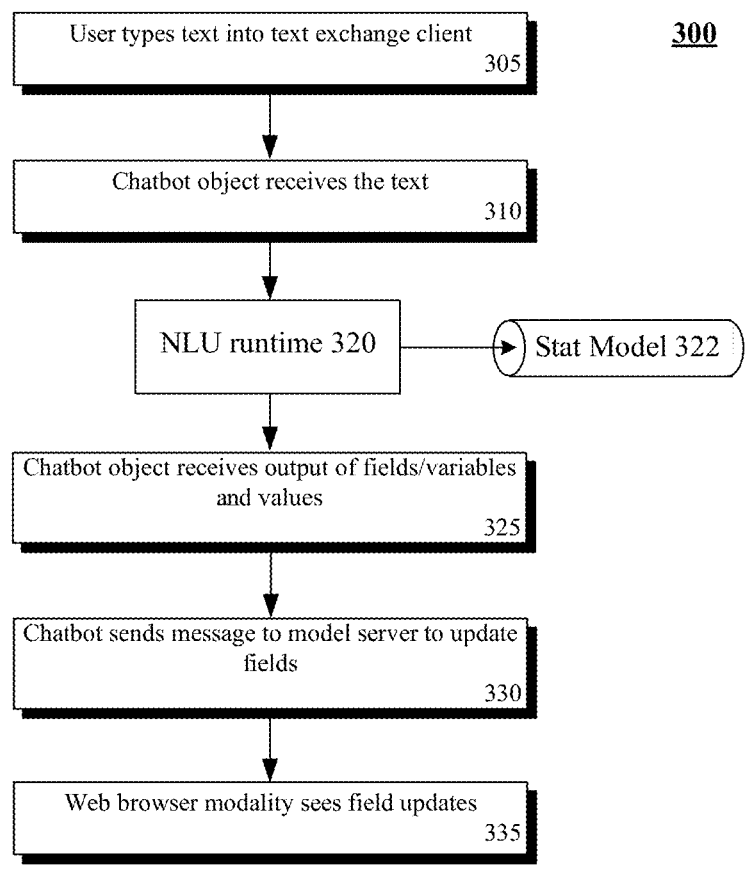
FIG. 3 is a flow chart of a method for using a Chatbot to convert text exchange input values associated with concrete fields of a converged services application in accordance with an embodiment of the inventive arrangements disclosed herein.

FIG. 3 is a flow chart of a method 300 for using a Chatbot to convert text exchange input values associated with concrete fields of a converged services application in accordance with an embodiment of the inventive arrangements disclosed herein. The method 300 can be performed in the context of a system 100 or any system that provides converged services.

The method can begin in step 305, where a user can type text into a text exchange client. In step 310, a Chatbot object can receive the text and send it to a NLU runtime component 320 for processing. Specifically, the text input can be matched against entries in a statistical language model 322, which can include application specific grammars as well as text exchange language specific grammars. The Chatbot object can receive results from the NLU runtime component 320, which maps the text exchange input to application specific fields/variables and values. In step 330, the Chatbot can send a message to a composite model server to update the field values based upon the mapped input. In step 335, a Web browser modality can see the field updates, which are automatically presented (i.e., after a browser refresh event) after the update occurs.

To illustrate method 300 with a concrete example, a user can enter "87 Honda ac broke" into a chat interface (step 305). The Chatbot object can receive the text (step 310) and can run the text through a car service NLU runtime component (320), which uses an application specific statistical model (322). The output of the process can be a set of fields and values for a car service application (step 325) (e.g., CarYear=87; CarMake=Honda; CarPart=ac; CarPartStatus=broke). The Chatbot server can send (step 330) a message to the model server to update the output fields (i.e., update fields/values for CarYear, CarMake, CarPart, and CarPartStatus). Other modalities listening for model server updates can receive new values for the fields and can update their views. For example, GUI fields of a Web browser for CarYear, CarMake, CarPart, and CarPartStatus can be automatically updated (step 335), which provides a user with updated information.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A method comprising:
receiving a Natural Language Understanding (NLU) statistical model that maps natural language requests to routing targets, a data store organized to define a plurality of fields, and a first record;
receiving text data corresponding to a portion of free-form natural language text, with the received text data relating to the first record;
determining a plurality of updated field values corresponding to at least one of a plurality of initial field values in the first record, using the received text data and the received NLU statistical model by matching the received text data against a plurality of entries which include a plurality of application specific grammars and a plurality of text exchange language specific grammars;
replacing at least one of the plurality of initial field values in the first record with the determined plurality of updated field values;
detecting at least one change in state for the NLU statistical model;
providing a notification to a subscribing view, which is configured to refresh and incorporate the at least one detected change in state for the NLU statistical model in response to the detecting; and
encrypting the plurality of fields in the data store to protect the plurality of fields from unauthorized access.

2. The method of claim 1, further comprising displaying, in a web browser, graphical user interface (GUI) elements corresponding to the plurality of fields.

3. The method of claim 2, further comprising detecting the updated field values to trigger an update event.

4. The method of claim 3, further comprising updating at least some of the displayed GUI elements in the web browser based on the determined plurality of updated field values being detected.

5. The method of claim 1, wherein:
the data store is modality independent; and
the data store is accessed in at least the following ways: visually through a web browser and by voice over a telephone connection.

6. The method of claim 1, wherein the received text data includes emoticons and chat slang.

7. The method of claim 1, wherein the NLU statistical model includes models that map a natural language request to possible routing targets.

8. The method of claim 1, further comprising running the text data through a car service NLU runtime component.

9. The method of claim 1, further comprising outputting the plurality of updated field values for a car service application.

10. The method of claim 1, wherein the determining the plurality of updated field values further comprises using the received NLU statistical model to map the received text data to at least one of the plurality of fields in the data store.

11. The method of claim 1, wherein the free-form natural language text is received via a first modality.

12. The method of claim 11, wherein the first modality is a free-form input modality.

13. The method of claim 12, wherein the determining the plurality of updated field values further comprises using the received NLU statistical model to map the text data received via the first modality to at least some of the plurality of fields in the data store.

14. The method of claim 1, wherein the listener architecture includes one or more listeners corresponds to the different channels of access for endpoint devices.

15. The method of claim 1, wherein first record includes a plurality of initial field values corresponding to the plurality of fields.

16. The method of claim 1, further comprising sending a message to a model server to update field values based upon a mapped input of the text data.

17. The method of claim 16, wherein the detecting the updated field values corresponds to different channels of access for endpoint devices through a listener architecture.

18. The method of claim 17, wherein the endpoint devices comprise a plurality of mobile computing devices.

19. The method of claim 18, wherein the listener architecture comprises at least one listener for the NLU statistical model.

\* \* \* \* \*